Sept. 20, 1971   H. ESCHHOLZ   3,605,238
APPARATUS FOR INTERNAL INSTALLATION OF RESILIENT SEALS
Filed Jan. 16, 1970   6 Sheets-Sheet 4
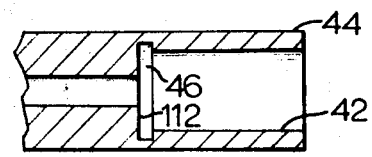
FIG. 9
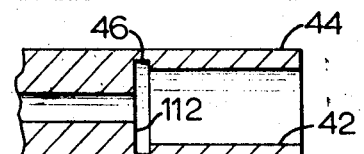
FIG. 10
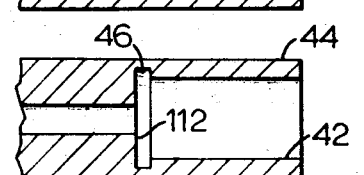
FIG. 11
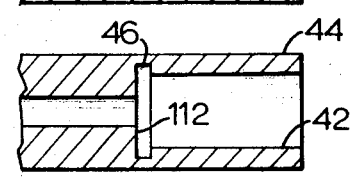
FIG. 12
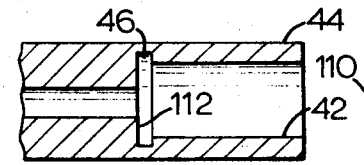
FIG. 13
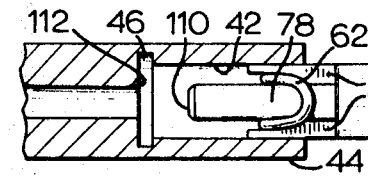
FIG. 14
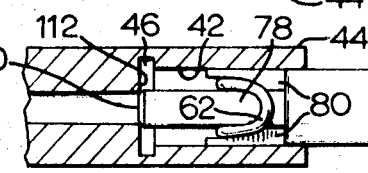
FIG. 15
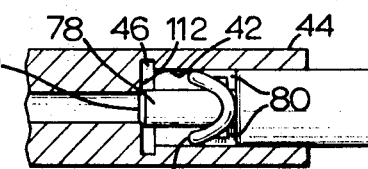
FIG. 16
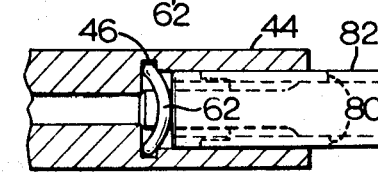
FIG. 17
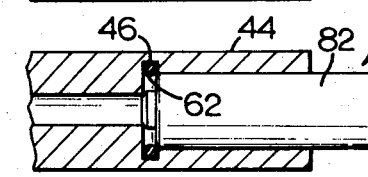
FIG. 18
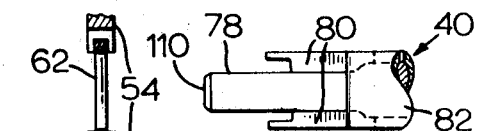
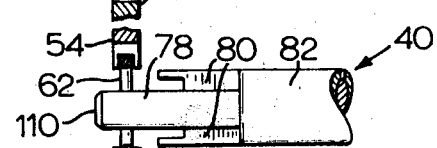
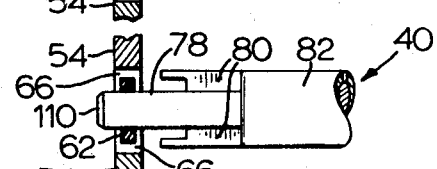
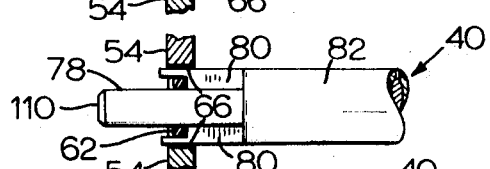
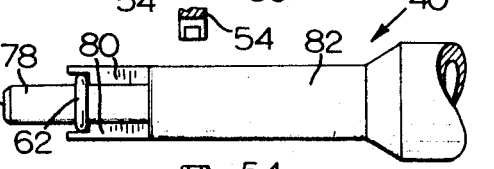
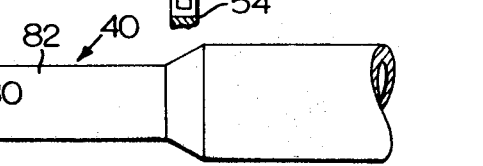
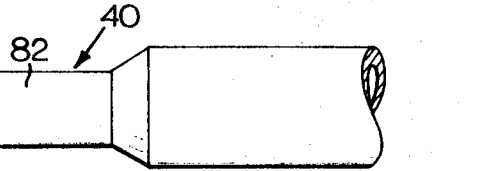
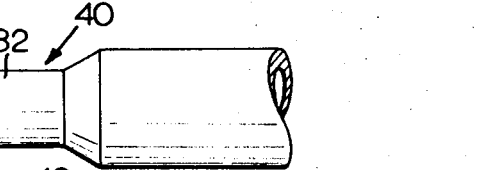
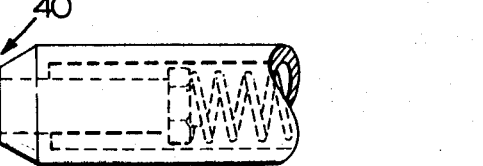
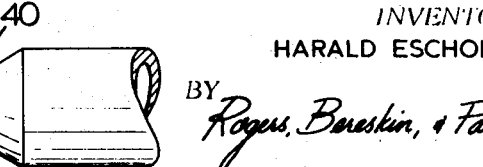
*INVENTOR.*
HARALD ESCHOLZ
BY
*Rogers, Bereskin, & Parr*

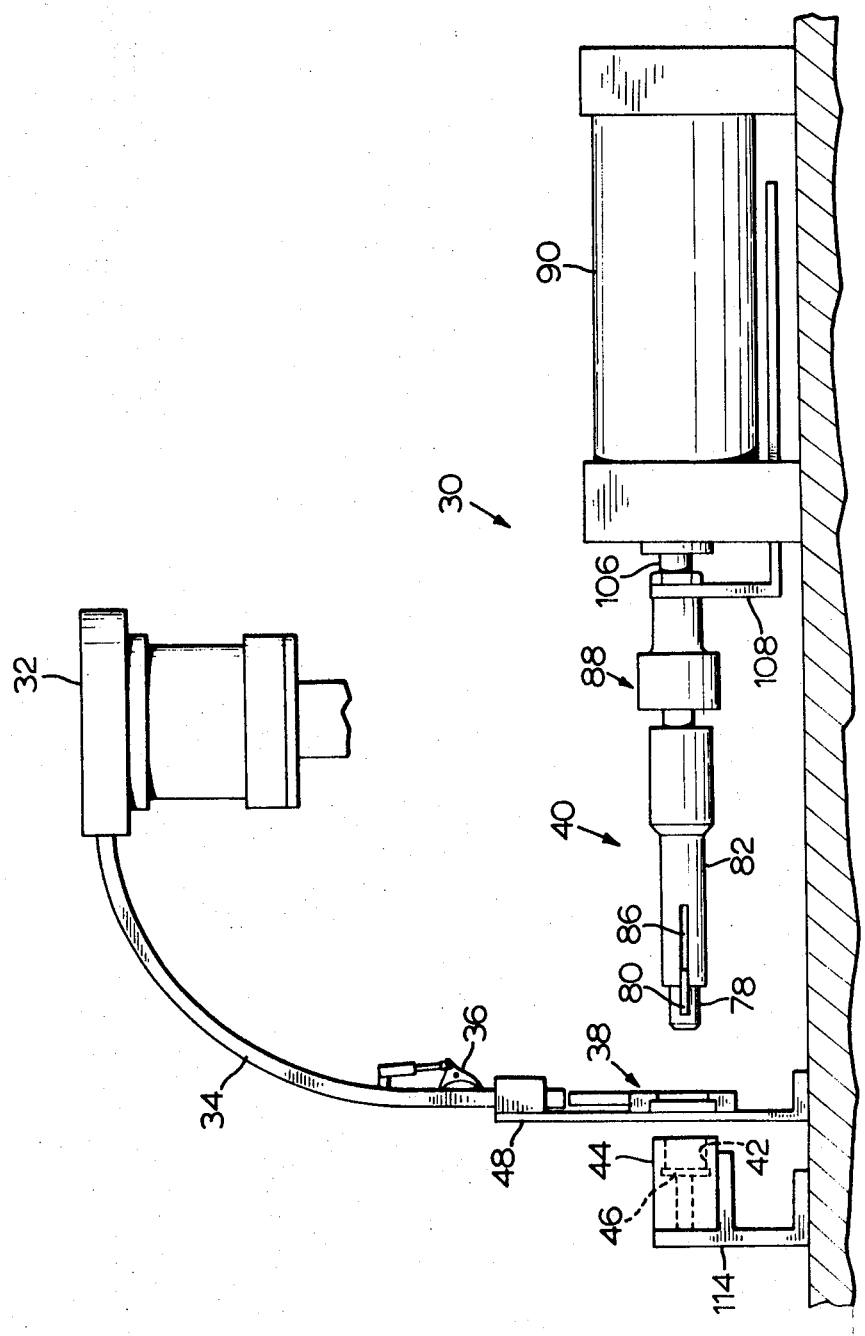

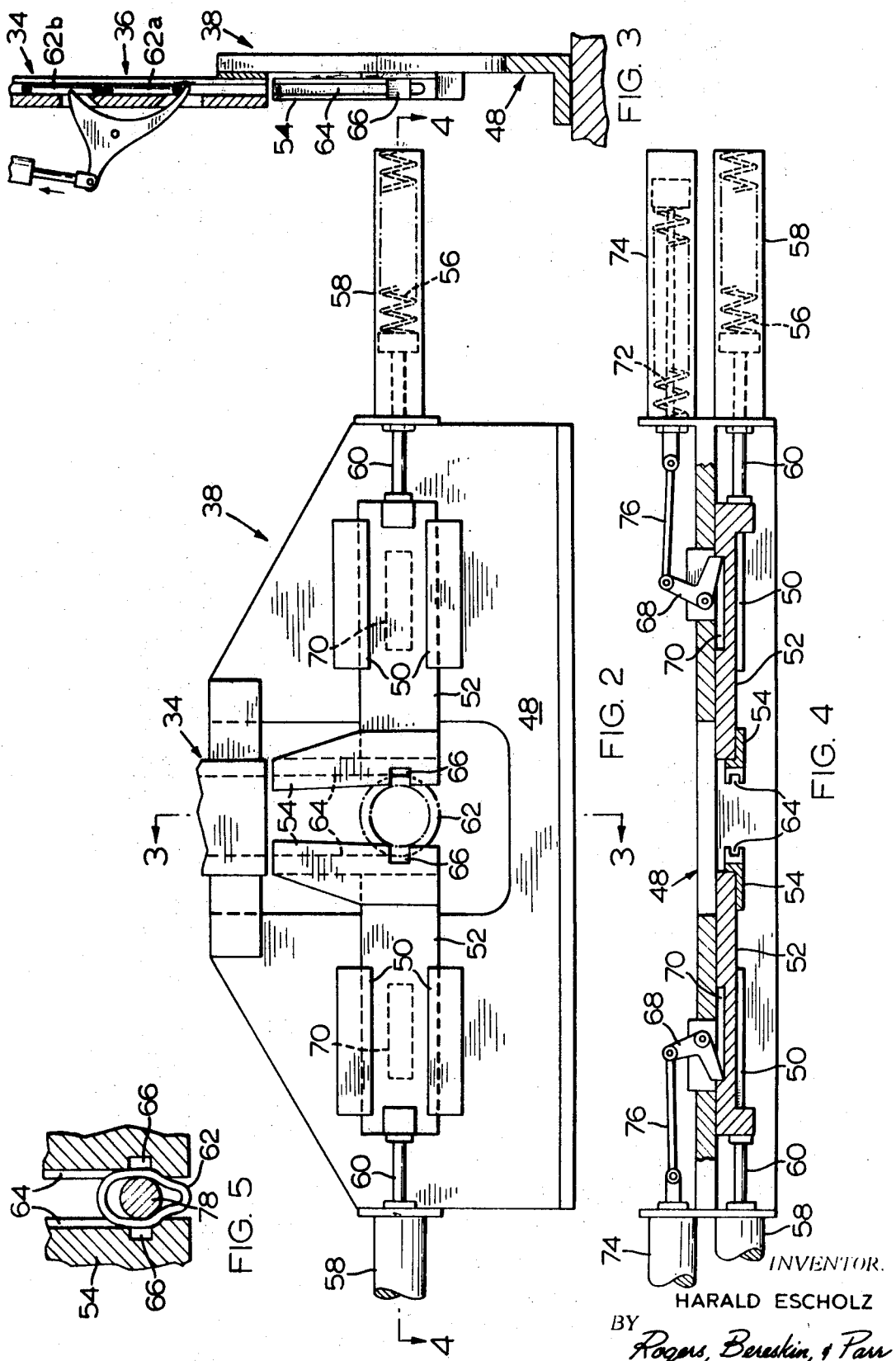

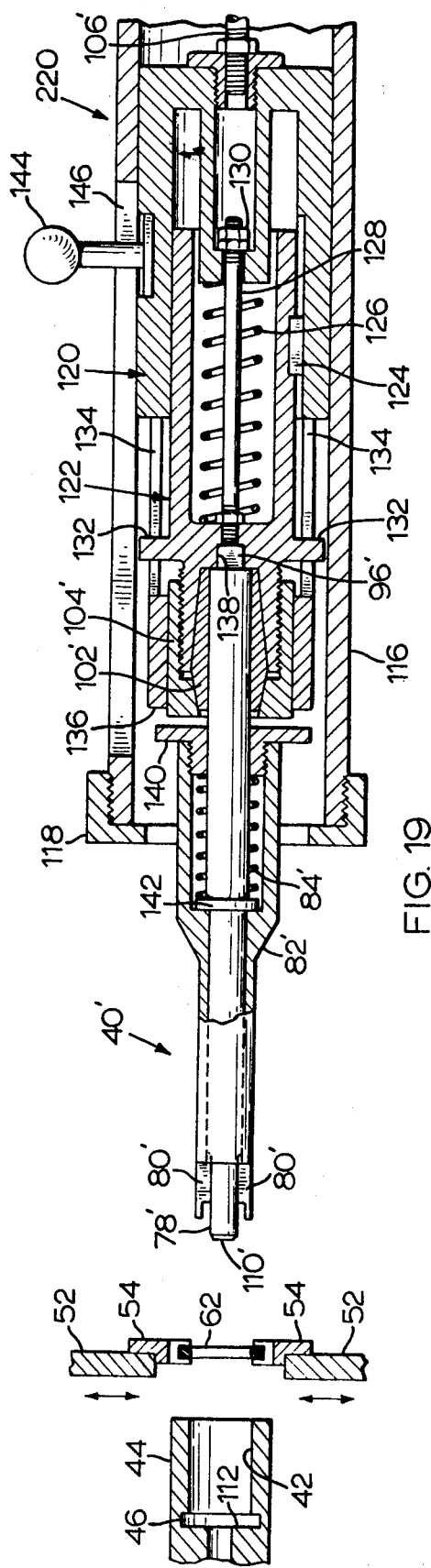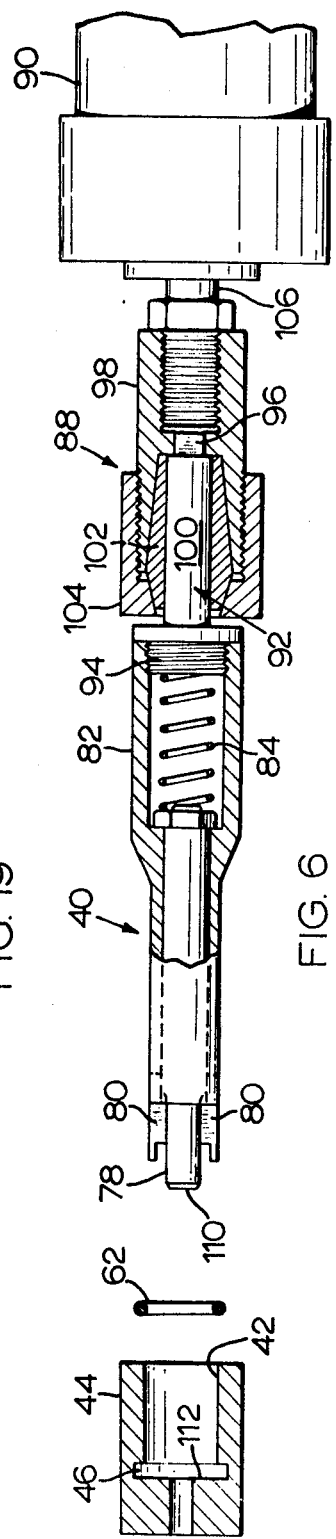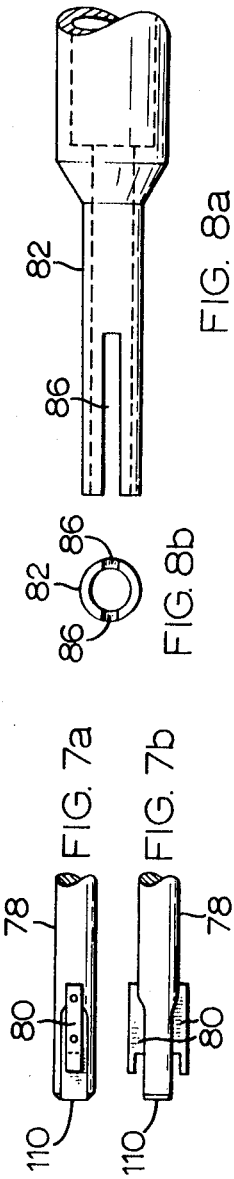

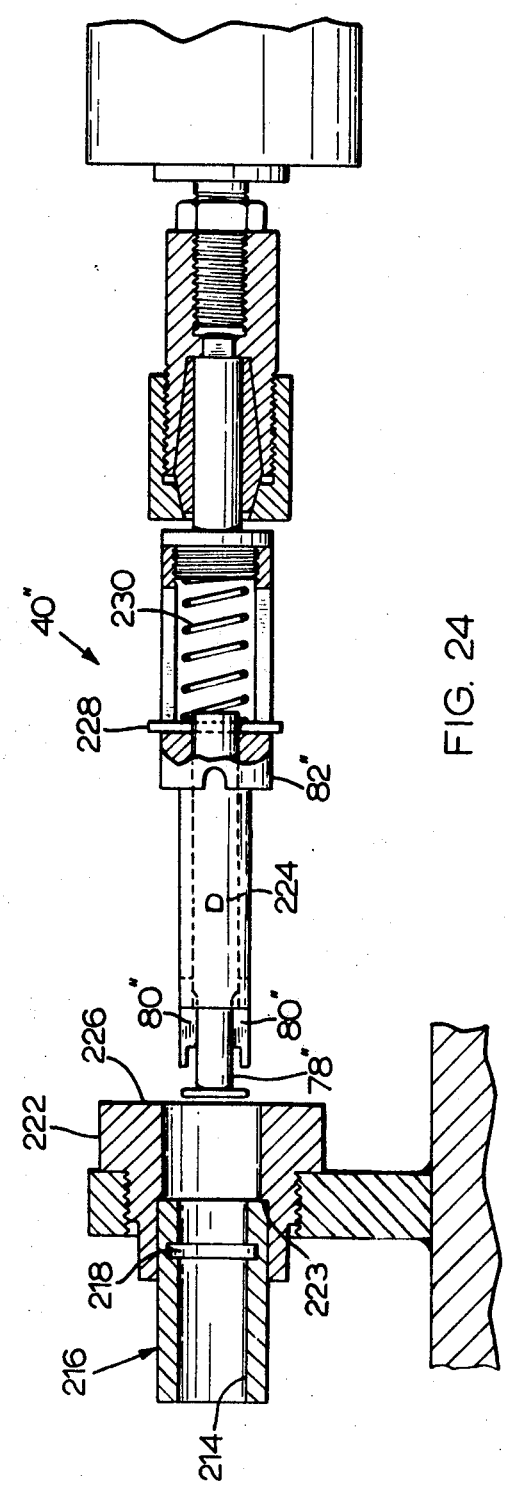

United States Patent Office 3,605,238
Patented Sept. 20, 1971

3,605,238
APPARATUS FOR INTERNAL INSTALLATION OF RESILIENT SEALS
Harald Eschholz, Islington, Ontario, Canada, assignor to Dick Gordon Rockwell, King, Ontario, Canada
Filed Jan. 16, 1970, Ser. No. 3,542
Claims priority, application Great Britain, Jan. 18, 1969, 3,009/69
Int. Cl. B23p *19/02, 19/04*
U.S. Cl. 29—208C
12 Claims

ABSTRACT OF THE DISCLOSURE

An apparatus for inserting annular resilient components such as seals into a groove formed in an internal opening. The apparatus includes a feeder mechanism which feeds the components to a positioning head to locate the components for an applicator mechanism. One component is picked up for each cycle of the applicator mechanism which carries the component on a pair of fingers into the opening. A sleeve then pushes the component off the fingers and into the groove into the opening.

---

This invention relates to apparatus for automatically inserting generally annular resilient components such as O-rings, lip seals, and the like into grooves formed in internal openings or bores of members requiring a fluid tight seal.

Objects of the present invention are to provide an improved apparatus for automatically and rapidly installing such resilient components without causing any permanent distortion of the components and without twisting them.

According to one aspect, the invention consists of a feeding mechanism which automatically feeds the components to a positioning head and an applicator mechanism which picks up each component from the positioning head and delivers it into an opening in a member requiring installation of the component. The applicator mechanism includes a ram having a pair of fingers adapted to remove the component from the positioning head and to insert the component into the opening, and means to force the component into the opening, and means to position inside the opening.

In drawings which illustrate embodiments of the invention,

FIG. 1 is a diagrammatic view of a preferred form of the invention;

FIG. 2 is a front view of a head for positioning the components;

FIG. 3 is a sectional side view taken along line 3—3 of FIG. 2;

FIG. 4 is a partial sectional plan view taken along line 4—4 of FIG. 2;

FIG. 5 is a view showing a typical component about to be picked up by the ram;

FIG. 6 is a sectional plan view through the center line of one form of an applicator mechanism;

Figure 20:
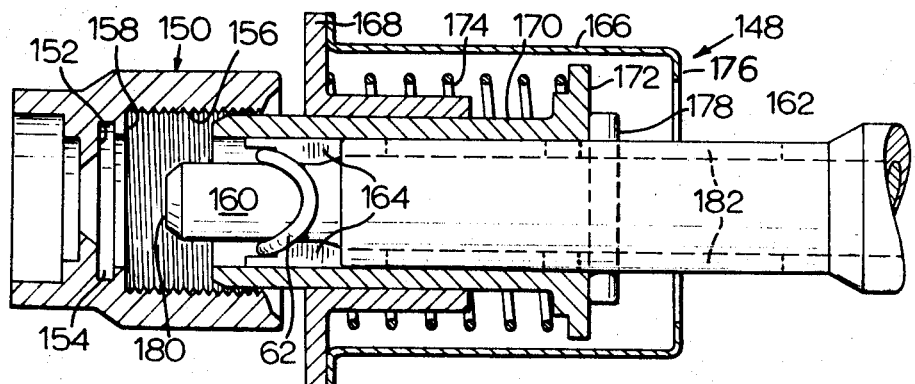
Figure 21:
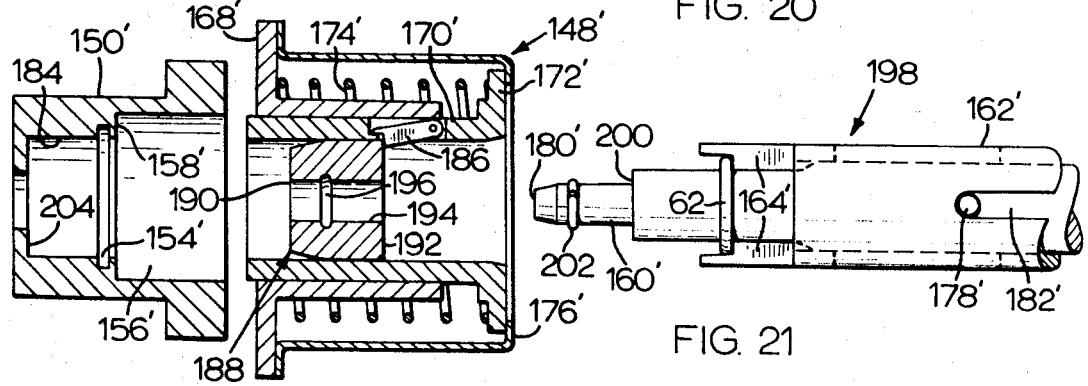
Figure 22:
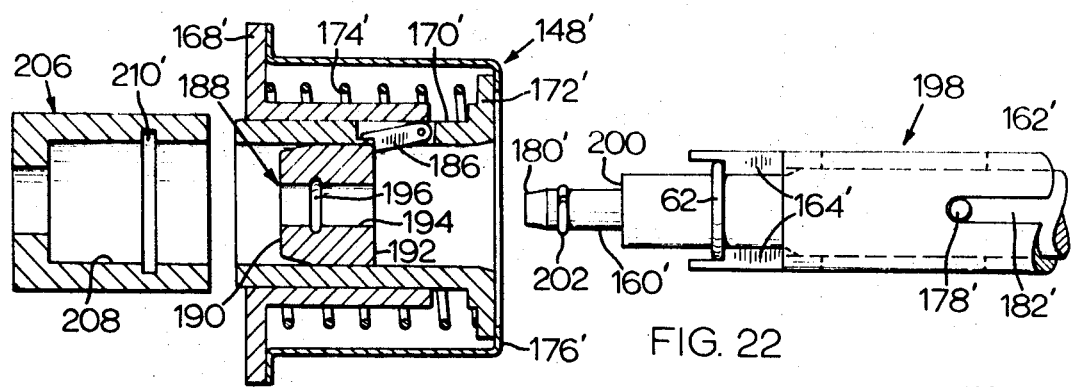
Figure 23:
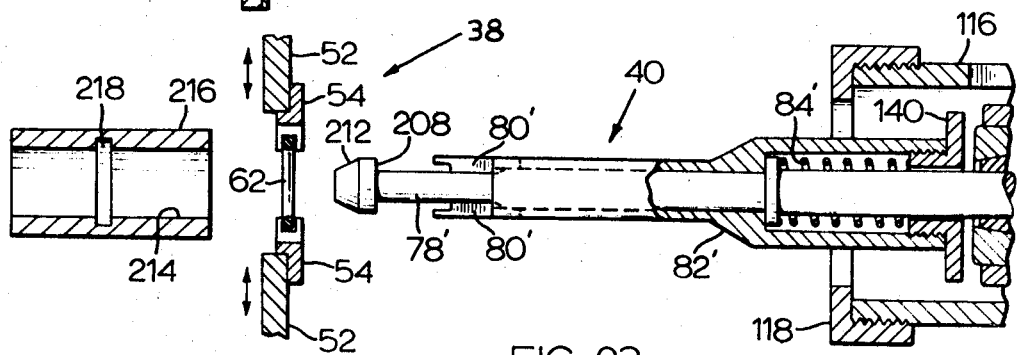

FIGS. 7(*a*) and 7(*b*) are side and plan views of the outer end of the ram, respectively;

FIGS. 8(*a*) and 8(*b*) are plan and end views of the outer end of a sleeve;

FIGS. 9 to 18 inclusive are simplified sectional plan views illustrating the sequence of steps in installing a component in a groove in an internal opening of a member;

FIG. 19 is a sectional plan view taken along the center line of another form of an applicator mechanism;

FIG. 20 is a simplified sectional plan view of an attachment for use with an applicator mechanism;

FIGS. 21 and 22 are simplified sectional plan views of another attachment for use with an applicator mechanism;

FIG. 23 is a simplified sectional plan view of yet another attachment; and

FIG. 24 is a sectional side view of yet another form of an applicator mechanism.

Referring to FIGS. 1 and 2 the apparatus of the invention is generally indicated by reference numeral 30, and it includes a conventional feeder 32 from which seals slide down a chute 34 into an escapement 36. The escapement 36 delivers one seal at a time into a head 38, and the seal is then picked up by an applicator mechanism 40 which moves outwardly towards an aperture 42 of a workpiece 44. As will be explained in detail below, the applicator mechanism is designed to automatically insert the seal in an internal groove 46 or similar recess formed in the aperture 42. After the seal is in place, the applicator mechanism 40 then returns to its original position to begin another cycle and the escapement 36 delivers another seal to the head 38.

Referring to FIGS. 2, 3, and 4 which more fully illustrate the head 38, a backing plate 48 supports two pairs of slides 50 carrying a pair of sliders 52 on which a pair of jaws 54 are mounted. The jaws 54 are normally biased towards each other by a pair of springs 56 (only one of which is shown). The springs 56 are contained in a pair of pneumatic cylinders 58 and act through the shaft 60 on the sliders 52. The jaws 54 are opened when required by controlling the supply of air to the cylinders 58. The chute 34 delivers a seal 62 into a pair of grooves 64 formed in the jaws 54 upon opening of the escapement 36. The grooves 64 terminate just below a pair of recesses 66 in the jaws 54, so that the seal 62 is held in the position shown in FIG. 2 when it falls from the chute 34. The jaws 54 are held apart by a pair of bell-crank levers 68 each of which locks against an end of a slot 70 in a respective slider 52 (FIG. 4). A pair of springs 72 (only one of which is shown) are contained in a pair of pneumatic cylinders 74. The springs 72 act through connecting rods 76 to retain the bell-crank levers 68 in the slots 70. When air pressure is applied to the cylinders 74, the bell-crank levers 68 move out of the slots 70 and allow the springs 56 in the cylinders 58 to push the jaws 54 towards each other. As explained below, the seal 62 is taken from the head 38 and is moved outwardly towards the workpiece 44 by a ram 78 (see FIG. 5). The air pressure is then applied to cylinders 58 so that the jaws 54 open fully to allow the applicator mechanism 40 to pass between the jaws 54. This operation is explained more fully below with reference to FIGS. 9 to 18. After the applicator mechanism 40 is withdrawn from the workpiece 44, the air pressure is removed from the cylinder 58 and the jaws 54 return to the position shown in FIG. 4.

Referring now to FIGS. 5, 6, 7 and 8, which illustrate one form of an applicator mechanism 40, the ram 78 has a pair of diametrically opposed, rigidly attached fingers 80 slideably mounted in a sleeve 82. A collar on the inner end of the ram 78 limits the outward travel of the ram and a spring 84 holds the ram 78 in the position shown in FIG. 6. A pair of slots 86 in the sleeve 82 receive the fingers 80 when the ram 78 is pushed into the sleeve 82 against the spring 84. A connector 88 for connecting the applicator mechanism 40 to a pneumatic cylinder 90 includes an adapter 92 having a threaded outer end 94 for attachment to the applicator mechanism 40, a square inner end 96 mating in a receiver 98, and a cylindrical body portion 100. A ferrule 102 is clamped on the cylindrical body portion 100 by a nut 104 threadably engaged on the receiver 98 which itself is threadably connected to shaft 106 of the hydraulic cylinder. Once the ferrule 102 is clamped on the cylindrical body portion 100 of the adapter 92, the applicator mechanism 40 may be removed from the connector 88 by simply loosening the nut 104. The applicator mechanism 40 shown in FIG. 6 is especially designed to insert seals 62 in a workpiece 44 of the type shown in FIG. 6. FIG. 1 shows a guide rod 108 fixed to the connector 88 for preventing rotation of the applicator mechanism. A suitable opening is provided in the support of the cylinder 90 for receiving the guide rod 108.

FIGS. 9 to 18 illustrate the steps executed by the applicator mechanism 40 in placing a seal 62 in a groove 46 formed in a workpiece 44. FIG. 9 shows a seal 62 between the jaws 54 of the head 38, the outer end 110 of the ram 78 with its diametrically opposed fingers 80, and the outer end of the sleeve 82. The applicator mechanism 40 moves outwardly until the outer end 110 of the ram 78 passes through the seal 62 and into the position shown in FIG. 10. Air pressure is then applied to the cylinders 74 (FIG. 4) to actuate the bell-crank levers 68 and thus release the jaws 54 so that they move inwardly under the action of the springs 56 (FIG. 4) to the position shown in FIG. 11. In this position the seal 62 is deformed into a generally oval shape as shown in FIG. 5. The ram 78 and fingers 80 continue to move outwardly through the recess 66 in the jaws 54 to surround the seal 62 (see FIGS. 5 and 12). Air pressure is then applied to the cylinders 58 (FIGS. 2 and 4) so that the jaws 54 are then withdrawn from engagement with the seal 62, and the ram 78 continues to move outwardly towards the workpiece 44 and it reaches the position shown in FIG. 13. FIG. 14 shows the ram 78 after it enters the workpiece 44 followed by the fingers 80 and the seal 62. In this position the seal 62 is bent both above and below the fingers 80 into a generally U-shape in plan, as shown in FIG. 14. The diameter of the ram 78 is such that the clearance between the ram 78 and the wall of the aperture 42 is adequate to allow free movement of the seal 62. The ram 78 continues moving into the aperture 42 until its outer end 110 abuts a shoulder 112 at the bottom of the aperture 42 as shown in FIG. 15. The pneumatic cylinder 90 (FIG. 6) continues to move the sleeve 82 forward, and the spring 84 (FIG. 6) becomes compressesd because the ram 78 is stopped from moving any further by the shoulder 112. The sleeve 82 then moves into contact with the seal 62 as shown in FIG. 16 and pushes the seal 62 through the aperture 42 until the seal 62 abuts against the shoulder 112 and the groove 46. The sleeve 82 continues to move forward until it seats the seal 62 completely in the groove 46 as shown in the FIGS. 17 and 18.

After the seal 62 is seated in the groove 46, the cylinder 90 removes the applicator mechanism 40 from the workpiece 44 and triggers a valve (not shown) which allows the jaws 54 to close into the position shown in FIG. 4. This movement actuates a second valve (not shown) which triggers the escapement 36, thereby permitting the lowermost seal 62 in the chute 34 to fall between the jaws 54 (as shown in FIG. 2) where it is in position for another cycle of operation. The form of the applicator mechanism shown in FIG. 1 and FIGS. 6 to 18, is best suited for use with a workpiece 44 that can be held in a stand 114 as in FIG. 1. The stand 114 must be strong enough to withstand the force required to compress the spring 84 to produce reciprocal motion between the ram 78 and sleeve 82. This arrangement is most suitable for workpieces having the shoulder 112 which will stop forward motion of the ram 78 and having a continuous cylindrical aperture 42 for guiding the seal and sleeve 82. However, a workpiece such as that shown in FIG. 22 may be used if a plug is inserted to provide a stop for the leading end 110 of the ram 78.

It is occasionally desirable to have the workman hold the workpiece 44 in his hand instead of placing it in a stand. The arrangement shown in FIG. 6 requires the workman to counteract the force of the spring 84, which is not particularly desirable. FIG. 19 illustrates another form of an applicator mechanism suitable for use with a hand-held workpiece in which parts corresponding to those shown in FIG. 6 are given prime numerals. A cylindrical housing 116 has an end cap 118 and a generally cylindrical sleeve carriage 120 slideably mounted in it. A generally cylindrical ram carriage 122 is slideably mounted inside the sleeve carriage 120 and has a key 124 to prevent rotation of one of said carriages relative to the other of said carriages. The ram carriage 122 is biased away from the sleeve carriage 120 by a spring 126. A rod 128, which is threadably connected at its outer end to the ram carriage 122, is provided with an adjustable stop 130 to limit the extension of the spring 126, as desired. A pair of diametrically opposed ears 132 on the ram carriage 122 are free to slide in a pair of slots 134 in a spacer 136.

The ram carriage 122 is rigidly connected to a ram 78' through a square socket 138 mating with a squared end 96' of the ram 78' and a ferrule 102' and nut 104' arrangement similar to that shown in FIG. 6. The ram 78' is slideably mounted inside a sleeve 82' having a plug 140 threadably engaged to retain a spring 84' for biassing a collar 142 and ram 78' away from the plug 140.

When the pneumatic cylinder 90 acting through the shaft 106' forces the sleeve carriage 120 to move outwardly, the springs 126 and 84' retain the parts in their relative positions as shown in FIG. 19 until the ears 132 on the ram carriage 122 connect with the plug 118. The ram 78' and the carriage 122 are then no longer free to move outwardly of the body 116 and the ram 78' is then positioned with its outer end 110' just touching the shoulder 112 of the workpiece 44. The sleeve carriage 120 continues to move outwardly until the spacer 136 hits the plug 140, whereupon the sleeve 82' is pushed along the ram 78' and the seal 62 is stripped off the fingers 80' and guided into the groove 46. All of the reactive forces are taken by the rigidly mounted housing 116 so that there is no force applied to the workpiece 44. A handle 144, which slides in a slot 146 in the housing 116 facilitates manual testing of the mechanism for the purpose of setting up the position of the various parts. The handle 144 also prevents rotation of the moving parts of the mechanism relative to the housing 116.

The embodiment of the applicator mechanism 40' shown in FIG. 19 is most suitable for use with workpieces of the kind shown in FIG. 19. This form of applicator mechanism 40' can also be used with workpieces of the kind shown in FIGS. 22 and 23 if a plug is inserted to produce a backstop to guide the seal 62 into the groove 46.

FIG. 20 shows a first attachment 148 for use with a workpiece 150 having an internal construction similar to that shown in FIG. 20. The workpiece 150 has a shoulder 152 forming a backstop, an annular groove 154 for receiving a seal 62, and an enlarged portion 156 terminating in an inwardly projecting radial flange 158. A ram 160 and a sleeve 162 similar to the rams and sleeves shown in FIGS. 6 and 19, form part of the applicator mechanism, and have a pair of diametrically opposed fingers 164 carrying a seal 62 between them. A housing 166 is rigidly mounted between the workpiece 150 and a head such as that indicated by reference numeral 38 in FIG. 1. The housing 166 is rigidly attached to a front plate 168 having a cylindrical bush 170 slideably mounted in it. The bush 170 is formed with a flange 172 and a spring 174 biasses the flange 172 away from the front plate 168. The housing 166 terminates in a flange 176 to prevent the flange 172 from leaving the attachment 148. As the ram 160 moves towards the workpiece, it enters the cylindrical bush 170 followed by the seal 62 and the sleeve 162. A radially extending pin 178 fixed to the ram 160 connects with the bush 170 and carries the bush 170 with the ram 160 towards the workpiece 150. When the outer end 180 of the ram 160 meets the shoulder 152, the ram 160, fingers 164, and bush 170 are stopped and the sleeve 162 continues to move forward in the same way as shown in FIGS. 16 to 18. Slots 182 in the sleeve 162 accommodate the pin 178 as the sleeve 162 moves relative to the ram 160.

The attachment shown in FIG. 21 is intended for use with a workpiece 150' of the kind shown in FIG. 21, wherein workpiece 150' has an enlarged cylindrical aperture 156' terminating in an inwardly projecting radial flange 158', and a groove 154' in a second cylindrical aperture 184. The second attachment 148' is the same as the first attachment 148 with the exception that the cylindrical bush 170' has a latch 186 hingedly mounted in a slot in the wall of the bush 170' A plug 188 is slideably mounted in the bush 170' and has an outer face 190, an inner face 192, a cylindrical aperture 194 and a groove 196 in the aperture 194. An applicator mechanism 198 (shown in part) for use with this attachment consists of a ram 160' having an outer end 180' and a step 200 to which a pair of fingers 164' are rigidly secured. A steel split ring 202 is loosely mounted in a groove on the ram 160'. The other parts of the applicator mechanism 198 are similar to those shown in FIG. 20. In its travel towards the workpiece 150', the ram 160' enters the plug 188 and the ring 202 enters the groove 196 in the plug. The shoulder 200 on the ram 160' then meets the inner face 192 of the plug 188 and carries the plug 188 towards the workpiece 150'. Before the plug 188 leaves the cylindrical bush 170', pin 178' meets the flange 172' on the cylindrical bush 170' and pushes the cylindrical bush 170' towards the workpiece 150'. The applicator mechanism 198 now moves forward carrying the plug 188 and bush 170' into the workpiece 150' until the bush 170' meets the radial flange 158' in the workpiece 150', and outer face 190 of the plug 188 meets a shoulder 204 in the workpiece 150'. The ram 160' thereupon stops its forward advance and the sleeve 162' then continues to move towards the workpiece 150' and pushes the seal 62 into the groove 154'. The combination of the plug 188 and bush 170' thus effectively changes the shape of the workpiece 150' into the same general shape as that of the workpiece 44 shown in FIG. 6. The plug is disconnected from the ram 160 when the latch 186 engages the inner end 192 of the plug 188 during the return stroke of the ram 160.

FIG. 22 shows the same applicator mechanism and attachment as described with reference to FIG. 21. However, the workpiece 150' in FIG. 21 has an enlarged cylindrical aperture 156', whereas workpiece 206 in FIG. 22 has an aperture 208 with the same diameter on both sides of the annular groove 210. A seal is applied to this workpiece by use of the plug only. A cylindrical bush is not required.

Referring to FIG. 23, an applicator mechanism 40' similar to that shown in FIG. 19 is fitted with a third form of attachment 212 on the leading end of a ram 78'. The attachment 212 has a maximum diameter just slightly less than the internal diameter of the seal 62 and of a cylindrical aperture 214 in a workpiece 216. After the attachment 212 has passed through seal 62, the jaws 54 press the seal against the ram 78' behind the attachment 212 into the shape shown in FIG. 5. The fingers 80' then pick up the seal 62 and the jaws 54 are withdrawn. The ram 78' travels into the workpiece 216 until the inner face 208 of the attachment 212 just passes the groove 218 of workpiece 216 so that the inner face 208 forms a back stop for the seal 62. The sleeve 82' continues to move forward and strips the seal 62 off the fingers 80' and then pushes the seal 62 into the groove 218. The applicator mechanism 40' is associated with a guide housing 220 (FIG. 19) so that no force is applied to the workpiece 216.

The attachment 212 is intended for use with seals having a relatively small diameter relative to the thickness of the seal. This ensures that the seal is sufficiently rigid to remain in the grooves 64 of the jaws 54 while the attachment 212 passes through the seal 62. The second form of attachment 148' is used for seals 62 having a relatively large diameter relative to the thickness of the seal.

Reference is now made to FIG. 24 which shows an applicator mechanism 40" having a ram 78" and sleeve 82" for placing a seal in the component 216 which was described with reference to FIG. 23. The mechanism 40" co-operates with a chuck 222 which locates the component 216 against a shoulder 223. The ram has a pair of diametrically spaced projections 224 (one of which is shown) for engaging the face 226 of the chuck 222 as will be described. The ram 78" also includes a guide pin 228 which travels in slots 230 in the sleeve 82" to prevent rotation of the ram and to limit its outward travel. The outer end of the ram 78" is enlarged to help in locating the seal in the same manner as described for attachment 212 (FIG. 23).

When a seal is placed in fingers 80" and the applicator mechanism is advanced, the ram proceeds into the aperture 214 in workpiece 216 until the enlarged end of the ram has just passed the annular groove 218. At this point the projections 224 will engage the face 226 of chuck 222 thereby preventing further movement of the ram 78". The sleeve 82" however continues to advance to strip the seal off the fingers 80" and to push the seal into the groove 218. Next the applicator mechanism 40" is withdrawn ready for a new cycle of operation.

The applicator mechanism 40" has the advantage that when used with the chuck 222 there is no force applied to the component 216 when the seal is inserted. Also the applicator mechanism 40" can be used for inserting a suitable seal in a range of components by choosing a chuck which locates the groove 218 in the same position relative to the front face 226.

In the foregoing description various means have been described for limiting the travel of the seal in order to accurately position it adjacent a groove. In some cases internal shoulders in the workpiece are utilized for this purpose; in other cases plugs may be employed to provide suitable backstops. It is obvious that the plugs may be inserted through either end of the workpiece, depending upon the configuration of the workpiece. The nature of the workpiece will thus dictate the nature of the backstop required. Similarly, while the various applicator mechanisms have been shown in a horizontal position, they can be used vertically if required.

What I claim as my invention is:

1. Apparatus for inserting annular resilient components including seals and the like into a workpiece, said workpiece having an aperture with an annular recess therein for receiving said component and said aperture having a longitudinal axis, said apparatus comprising:
  (a) means for sequentially positioning said components transversely of said axis, and including means for deforming each said component into a generally oval shape;
  (b) applicator means operable sequentially to remove said components from said positioning means and to sequentially position said components in said workpiece, said applicator means comprising:
    (i) a ram having fingers adapted to hold said component in said oval shape;
    (ii) release means longitudinally reciprocable relative to said ram for stripping said component off said fingers and into said aperture adjacent said annular recess, and including means for moving said component longitudinally in said aperture to position said component in said recess,
  (c) actuator means for varying the longitudinal separation of said positioning means and said applicator means between predetermined limits to enable said ram to be positioned inside said component with said fingers engaging said component to hold it in said oval shape, and including means for varying the longitudinal separation of said applicator means and said workpiece between predetermined limits to position said component in said aperture and to move said component into said recess.

2. Apparatus as claimed in claim 1 wherein said release means further comprises a sleeve reciprocally journalled on said ram for longitudinal movement relative to said ram between a withdrawn position wherein said sleeve is clear of said fingers and an advanced position for stripping said component off said fingers and positioning said component in said recess.

3. Apparatus as claimed in claim 2 wherein said applicator means further comprises means resiliently biasing said sleeve toward said withdrawn position, and wherein said applicator mechanism further comprises stop means attached to said ram for engaging a fixed portion of said apparatus and said workpiece such that as said actuator means brings together said applicator means and said workpiece, said ram engages said stop means and said sleeve moves into said advanced position to strip said component off said fingers and position said component in said recess.

4. Apparatus as claimed in claim 3 wherein said positioning means and said workpiece are fixed longitudinally and wherein said actuator means moves said applicator means longitudinally to pick up said component off said positioning means and to position said component in said recess.

5. Apparatus as claimed in claim 3 wherein said workpiece is fixed longitudinally and said actuator means moves said positioning means to engage said component in said fingers, and wherein said actuator means moves said applicator mechanism to position said component in said workpiece.

6. Apparatus as claimed in claim 4 wherein said ram has a diameter substantially less than the diameter of said aperture, said fingers being rigidly attached to said ram for entering said aperture with said ram; and said ram further comprises: an enlarged outer end having a diameter slightly less than diameter of said aperture for locating said component in said recess, said stop means being adapted to stop said ram with said enlarged outer end in a position just beyond said recess whereby as said sleeve moves into said advanced position, said component is guided into said recess by said enlarged outer end.

7. Apparatus as claimed in claim 6 wherein said sleeve is tubular and is slidably engaged about said ram for longitudinal motion relative to said ram, said sleeve comprising a leading end defining a plurality of longitudinal slots for receiving said fingers so that upon outward movement of said sleeve relative to said ram, said sleeve strips said component off said fingers and positions said component in said recess.

8. Apparatus as claimed in claim 7 wherein said positioning means comprises:
(a) a pair of opposed jaws, said jaws being spaced-apart about said axis for locating said component substantially concentrically about said axis;
(b) guide means coupled to said jaws for guiding said jaws transversely of said axis from an inner position for holding said component in said oval shape, through an intermediate position for receiving and positioning a component and on to an outer position wherein said jaws are withdrawn to permit free longitudinal movement of said applicator means past said positioning means; and
(c) means responsive to the position of said applicator means for moving said jaws between said intermediate position and said inner position to deform said component into said oval shape, and for moving said jaws between said inner and outer positions.

9. Apparatus as claimed in claim 8 wherein each said jaws has an inner face, said inner faces being spaced-apart and substantially parallel, and each said inner face having a shallow groove for receiving and positioning a component, and a longitudinal recess providing clearance for said fingers so that as said fingers are carried by said ram into said positioning means, said fingers engage said component to hold said component in said oval shape.

10. Apparatus as claimed in claim 9 wherein said apparatus further comprises: a chute for guiding said components into said grooves; an escapement coupled to said chute for controlling the flow of said components into said grooves; and means for opening said escapement to permit a component to enter said grooves, said opening means being responsive to the position of said applicator means.

11. Apparatus as claimed in claim 10 wherein said actuator means and said moving means are controlled hydraulically.

12. Apparatus as claimed in claim 7 wherein the axial extent of said aperture is small by comparison with the diameter of said component, and wherein said apparatus further comprises: a tubular guide bush having an inner diameter substantially equal to the diameter of said aperture; means for locating said bush coaxially with said aperture such that the inner cylindrical surface of said bush forms a continuation of said aperture for guiding said component as said sleeve moves into said advanced position to position said component in said recess.

References Cited

UNITED STATES PATENTS

| | | | |
|---|---|---|---|
| 3,289,286 | 12/1966 | Belanger | 29—235 |
| 3,455,011 | 7/1969 | Harding | 29—235 |

THOMAS H. EAGER, Primary Examiner

U.S. Cl. X.R.

29—211D, 235